US012223035B2

(12) United States Patent
Zmijewski et al.

(10) Patent No.: US 12,223,035 B2
(45) Date of Patent: Feb. 11, 2025

(54) PROTECTING SOFTWARE SUPPLY CHAIN USING SECURE LOG GENERATED IN A TRUSTED BUILD ENVIRONMENT

(71) Applicant: Intel Corporation, Santa Clara, CA (US)

(72) Inventors: Piotr Zmijewski, Gdansk (PL); Arkadiusz Berent, Pomorskie (PL); Mateusz Bronk, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 116 days.

(21) Appl. No.: 17/551,558

(22) Filed: Dec. 15, 2021

(65) Prior Publication Data

US 2022/0108005 A1    Apr. 7, 2022

(51) Int. Cl.
*G06F 21/53*   (2013.01)
*G06F 8/41*    (2018.01)
*G06F 21/57*   (2013.01)

(52) U.S. Cl.
CPC ............... *G06F 21/53* (2013.01); *G06F 8/41* (2013.01); *G06F 21/57* (2013.01); *G06F 2221/033* (2013.01)

(58) Field of Classification Search
CPC . G06F 21/53; G06F 8/41; G06F 21/57; G06F 2221/033; G06F 8/71
See application file for complete search history.

(56) References Cited

U.S. PATENT DOCUMENTS

| | | | |
|---|---|---|---|
| 11,106,458 B2* | 8/2021 | Adams | G06F 8/71 |
| 11,327,745 B2* | 5/2022 | Michiyama | G06F 8/71 |
| 2019/0303579 A1* | 10/2019 | Reddy | H04L 9/50 |
| 2020/0007554 A1* | 1/2020 | Vincent | G06F 21/31 |
| 2020/0177397 A1* | 6/2020 | Harrington | H04L 9/3297 |
| 2021/0042216 A1* | 2/2021 | Magnezi | G06F 8/658 |
| 2021/0397447 A1* | 12/2021 | Crabtree | G06Q 20/065 |
| 2022/0284100 A1* | 9/2022 | Simon | G06F 8/61 |

* cited by examiner

*Primary Examiner* — Beemnet W Dada
(74) *Attorney, Agent, or Firm* — JAFFERY WATSON HAMILTON & DESANCTIS LLP

(57) ABSTRACT

A method comprises generating, during a software build process conducted in a trusted build environment, a trusted log comprising a plurality of records of actions performed during the software build process and a plurality of identifiers of tools used to perform the actions, aggregating the plurality of records of actions and the plurality of identifiers into a build certificate file, generating a digital signature to be applied to the build certificate, and publishing the build certificate in association with one or more build artifacts generated by the software build process.

18 Claims, 7 Drawing Sheets

PROTECTING SOFTWARE SUPPLY CHAIN USING SECURE LOG GENERATED IN A TRUSTED BUILD ENVIRONMENT

BACKGROUND

A typical software supply chain consists of multiple stages. It begins with source code being produced by developers, which is typically committed to a shared repository. The source code is downloaded, together with external dependencies, by a build environment and is subjected to a set of verification steps (e.g., statical code analysis, tests etc.) during the build process. Finally, a release package with all the build artifacts is produced and deployed.

Due to complexity of the build process, malicious attacks on the various elements of the software supply chain (e.g., injecting a malicious source code, skipping or malforming verification steps, modifying binaries) are hard to identify, which often allows them to remain unnoticed for periods of time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
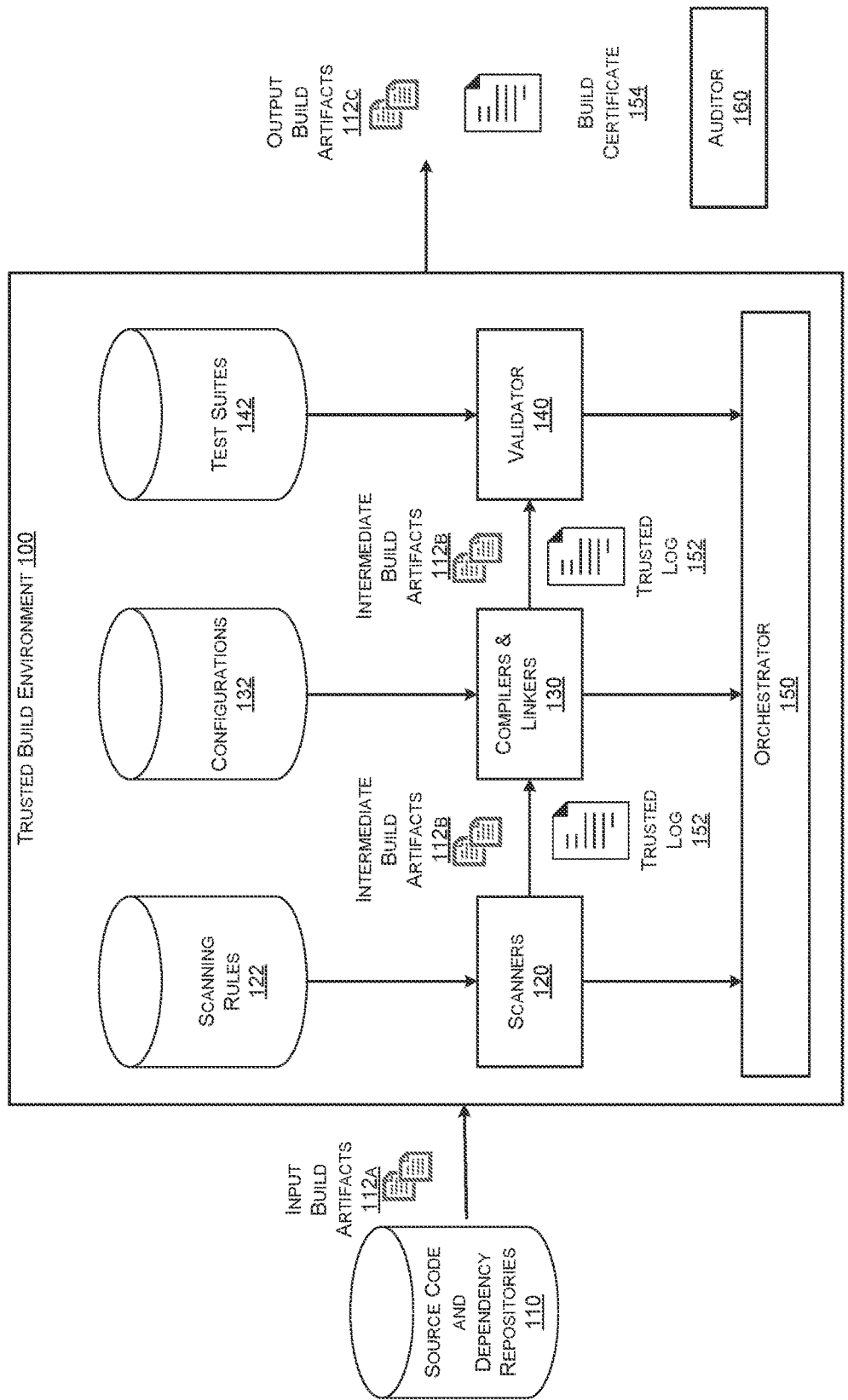
FIG. 1 is a simplified schematic diagram of a trusted build environment in which techniques to protect a software supply chain using a secure log generated may be implemented, in accordance with an embodiment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C) Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As described above, due to complexity of the build process, malicious attacks on the various elements of the software supply chain (e.g., injecting a malicious source code, skipping or malforming verification steps, modifying binaries) are hard to identify, which often allows them to remain unnoticed for periods of time. Various forms of manual human inspections of various steps of the process (e.g., manual source code reviews, examining the list of tests that were executed or reviewing the results of static analysis) are commonly used in an attempt to address these issues. As human inspections of the build process are often partial, unstructured and the results are not published, it can be difficult or impossible for the recipient of the build artifact to gain any insight into matters such as what source code and what dependencies were used to build the software, whether there any scans (e.g., static analysis) run, what build tools and in which versions (e.g., compilers, linkers) were used, what (if any) quality assurance steps were taken, etc. This deficiency in information creates a large attack surface on the multiple aspects of the build chain (e.g., changing rules for a scanner, skipping a validation step, changing a genuine compiler to an infected one etc.) with a high probability for an attacker to stay unnoticed for a long period of time.

To address these and other issues, described herein are systems and techniques to add detailed measurements for various steps of a software build process. In some examples, at each stage of the build process a trusted log is produced that includes measurements of tools being executed, inputs taken by the tools (e.g., hashes of the source code files, rules or configuration files applied, etc.), and actions performed by that software, including the order and timestamps of the actions. Based on the secure logs, a certificate of software origin may be issued for various build artifacts. The certificate can be used to audit details of the build process, including which tools were run, in which order, what were their versions, configurations, inputs etc., in case an inspection is needed (e.g., due to an attack on the supply chain).

Systems and techniques described herein enable a formal audit of the steps of the build process for a given software component. By inspecting a certificate of software origin associated with a given software component, an auditor can verify security factors including that the component was built from an expected set of sources and dependencies, using an approved set of build tools and that all the expected scans and validation steps successfully passed.

FIG. 1 is a simplified schematic diagram of a trusted build environment 100 in which techniques to protect a software supply chain using a secure log generated may be implemented, in accordance with an embodiment. Referring to FIG. 1, in some examples, a trusted build environment 100 comprises one or more scanners 120, one or more compilers and linkers 130, and one or move validators 140. The trusted build environment 100 further comprises a repository for scanning rules 122, a repository for configurations 132, and a repository for test suites 142. Trusted build environment 150 may further comprise and orchestrator 150 and an auditor 160. In some examples various components described herein may be instantiated and/or execute within a trusted execution environment (TEE).

Figure 7:
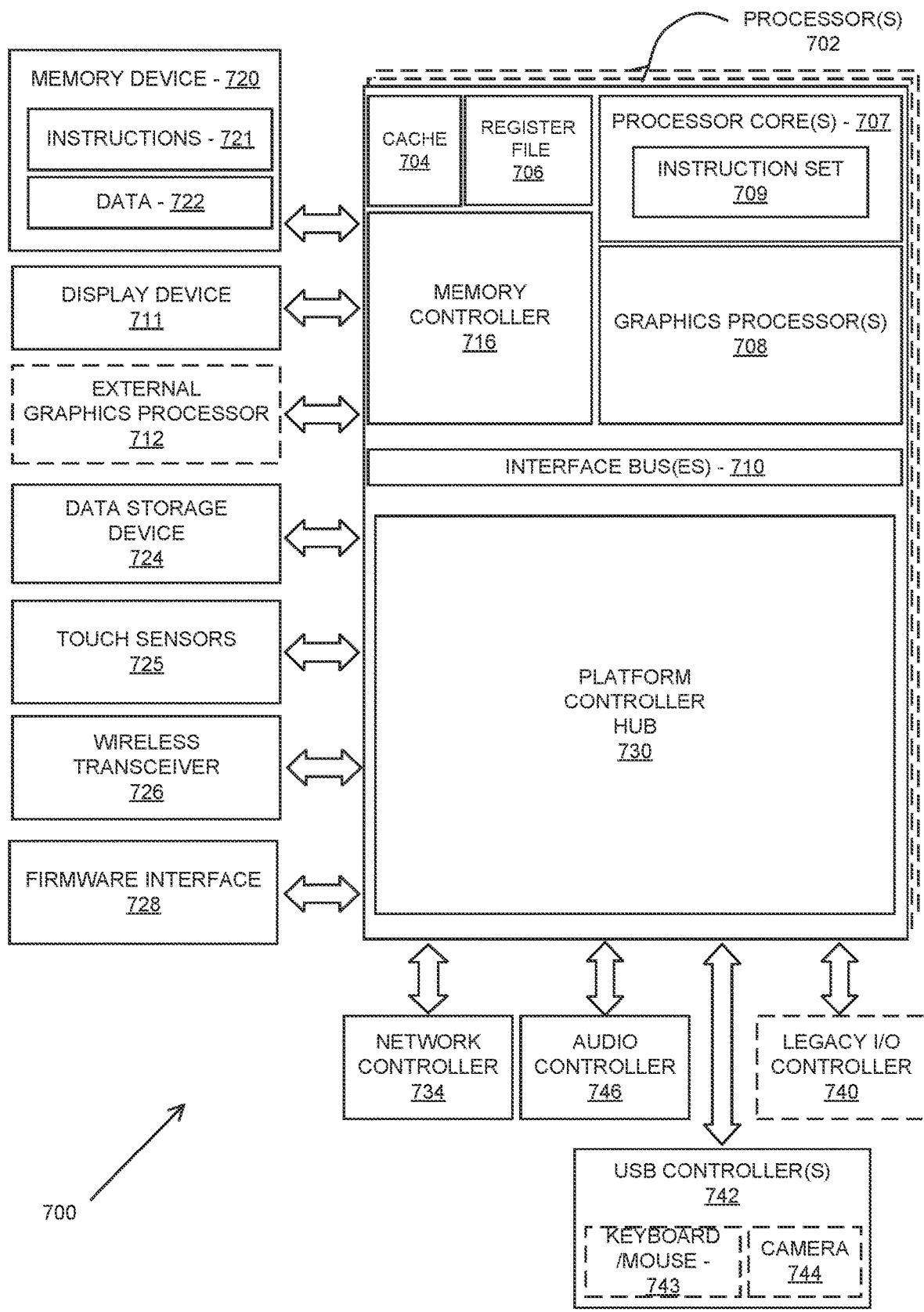
FIG. 7 is a block diagram illustrating a computing architecture which may be adapted to provide a method validate a software supply chain using a secure log generated in a trusted build environment selection according to an embodiment.

In some examples the various components of the trusted build environment (e.g., the scanners 140, compilers and linkers 130, validators 140, orchestrator 150, and auditor 160) may be implemented by software-defined process that execute on a general-purpose computing system, such as the system depicted in FIG. 7. In other examples the various components may be implemented in a configurable processing device such as a field programmable gate array (FPGA) or reduced to hard-wired circuitry. Further, in some examples the build process may contain additional operations, fewer operations, or different operations depending, for example, on the instance of the process and on the complexity of the process.

During the build process, the trusted build environment 100 receives as inputs files from source code and dependency repositories 110 and one or more input build artifacts 112a. In some examples, one or more scanners 120 apply scanning rules 122 against the source code and dependency files 110 to perform static analysis, vulnerability, and software license assessments, etc. The intermediate build artifacts 112b are then passed to one or more compilers and linkers 130, which use configurations 132 to generate intermediate build artifacts 112b including executable code, which are input to a validation process 140 that applies one or more test suites 142 to the intermediate build artifacts 112b to generate output build artifacts 112c. In some examples the actions implemented during the build process may be performed independently and/or in parallel, and are recorded in the trusted logs 152

In accordance with aspects described herein, a trusted log 152 may be produced at each step of the software build process. The trusted log 152 may be produced by an orchestrator 150 that is able to monitor and measure all the executables that are run in the trusted build environment 100. The trusted log 152 contains all the actions performed at a given build stage, e.g., timestamps and measurements (hashes) of executed binaries and their inputs. Operations of the various components of trusted build environment 100 will be described with reference to the flowcharts in FIG. 2 and FIG. 4. In some examples the trusted output is an output of the process that may be published with the output build artifacts 112c. In other examples a trusted third party performs an appraisal that consumes the trusted log(s) 152 and one or more reference values and produces a simplified build certificate signed by the appraiser.

Figure 2:
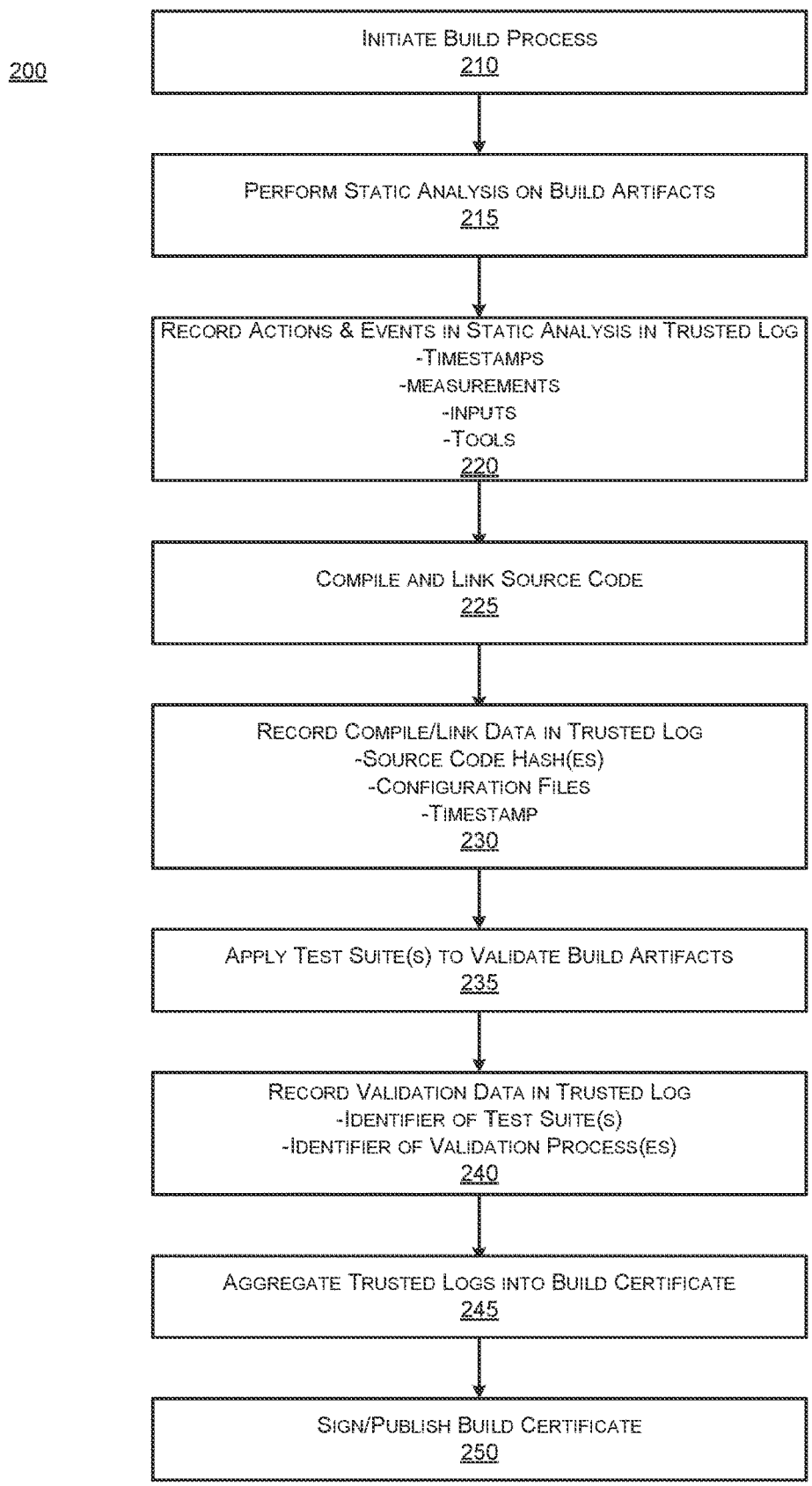
FIG. 2 is a simplified flow diagram of operations in a method to protect a software supply chain using a secure log generated in a trusted build environment according to an embodiment.

FIG. 2 is a simplified flow diagram of operations in a method 200 to protect a software supply chain using a secure log generated in a trusted build environment 100 according to an embodiment. Referring to FIG. 2, at operation 210 a software build process is initiated in the trusted build environment 100. As described above, the trusted build environment 100 receives as inputs files comprising source code and dependency repositories 110 and one or more input build artifacts 112a. At operation 215 a static analysis is performed on the source code. In some examples, one or more scanners 120 apply scanning rules 122 against the source code and dependency repositories 110 to perform static analysis, vulnerability, and software license assessments, etc.

At operation 220 the orchestrator 150 records actions performed and events that occur during the static analysis operations in a trusted log 152. In the environment 100 depicted in FIG. 1, the orchestrator 150 receives inputs from the one or more scanners 120 including timestamps reflecting when various scanning tools were run, an identifier indicating which scanner tools were executed (e.g., version and a hash of the binary), and one or more hashes of all the files being scanned and scanning rules 122 that were applied. Further, the orchestrator 150 may receive one or more timestamps of an executed binary file and one or more hashes of the executed binary file. These inputs may be recorded in a trusted log 152, which is then passed to the next stage of the process.

The intermediate build artifacts 112b are then passed to one or more compilers and linkers 130, which, at operation 225, use configurations 132 to generate additional intermediate build artifacts 112b including executable code. At operation 230 the orchestrator 150 records compile and link data in the trusted log 152. In the compiling/linking process the orchestrator 150 may receive one or more build configurations, one or more identifiers of a compiler used to compile an intermediate build artifact 112b, and one or more identifiers of a linker used to compile an intermediate build artifact 112b. These inputs may be recorded in the trusted log 152, which is then passed to the next stage of the process, which is a validation process.

At operation 235, in the validation process a validator 140 may apply one or more test suites 142 to the intermediate build artifacts 112b to validate the intermediate build artifacts 112b. At operation 240 the orchestrator 140 records validation data in the trusted log 152. For example, the orchestrator 140 may record an identifier of one or more test suites used in the validation process or one or more identifiers of a validation process used to validate an intermediate build artifact 112b.

After validation 140, at operation 245, the trusted logs 152 may be aggregated into a single file referred to herein as a build certificate 154 that may be signed by the build environment 100 and published together with the output build artifacts 112c generated during the build process. Thus, the build certificate 154 contains details about all the steps of the build process, their order, timestamps and hashes of tools and their inputs being executed, and a reference (e.g., a hash) of the final build artifacts 112c. At operation 250 the build certificate 154 is digitally signed by the trusted build environment 100, and the build certificate 154 is published in association with the output build artifacts 112c.

In some examples, the digital signature applied to the build certificate 154 by the build environment 100 enables an auditor 160 to validate the authenticity and integrity of the build certificate (e.g., using certificate chain published by the build environment 100). In some examples, the digital certificate can contain hashes of the files used during the build process, while the files can be archived by the build environment and presented upon request.

Trustworthiness of the trusted logs 152 and the build certificate 154 is provided by a trusted build environment 100, which can be exemplified by a trusted third-party infrastructure that may be running in a measured environment such as a trusted platform module (TPM) or inside an attestable trusted execution environment (TEE). Introducing a hardware-based attestation to the build environment enables the addition of attestation evidence to the build certificate 154 that the auditor 160 could use to formally verify that it was the expected set of software tools (e.g., scanners, compilers, linkers etc.) that were run on non-revoked platforms with a certain trusted computing base.

Figure 3:
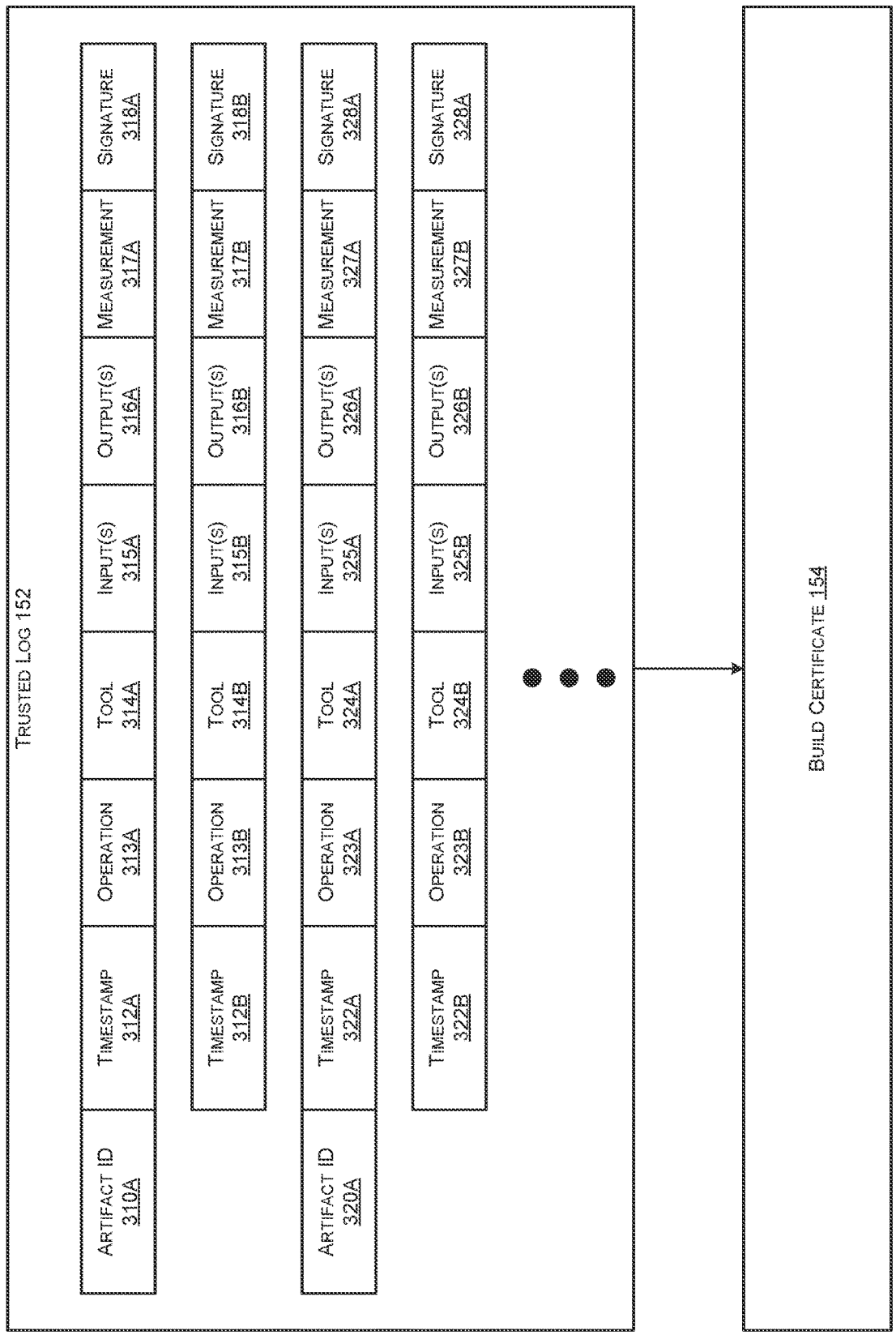
FIG. 3 is a simplified block diagram of a trusted log developed in a method to protect a software supply chain using a secure log generated in a trusted build environment according to an embodiment.

FIG. 3 is a simplified block diagram of a trusted log 152 developed in a method to protect a software supply chain using a secure log generated in a trusted build environment according to an embodiment. Referring to FIG. 3, in one example a trusted log 152 includes a record of an artifact identifier 310A and records of the timestamps (312A, 312B) performed on the source code, operations performed (313A, 313B, tools (314A, 314B) used to perform of the operations (313A, 313B), inputs (315A, 315B) to the operations (313A, 313B), and outputs (316A, 316B) resulting from operations (313A, 313B), measurements (317A, 317B) resulting from the operations (313A, 313B), and a signature (318A, 318B). Similarly, trusted log 152 includes a record of a second artifact identifier 320A and records of the timestamps (322A, 322B) performed on the source code, operations performed (323A, 323B, tools (324A, 324B) used to perform of the operations (323A, 323B), inputs (325A, 325B) to the operations (323A, 323B), and outputs (326A, 326B) resulting from operations (323A, 323B), measurements (327A, 327B) resulting from the operations (323A, 323B), and a signature (328A, 328B). The trusted log 152 may comprise additional records for other source codes entered into the trusted build environment. As described above, the contents of the trusted log, or data representative thereof (e.g., a hash) are aggregated into a build certificate 154.

In some examples the build certificate 154 may be used to provide auditability of the associated build artifacts 112 to certify the authenticity of the source code files and dependencies that were used to construct the build artifacts 112 the set of tools (including their order and configuration) applied during the build process. In some examples, the build certificate 154 may be used by an auditor 160 to verify the list of steps and tools that were executed, especially when there is a flaw in one of the steps and there is a need to verify which build artifacts are affected by that flaw. In some examples the auditor 160 may reside in the trusted build environment 100, while in other examples the auditor may reside outside the trusted build environment 100.

Figure 4:
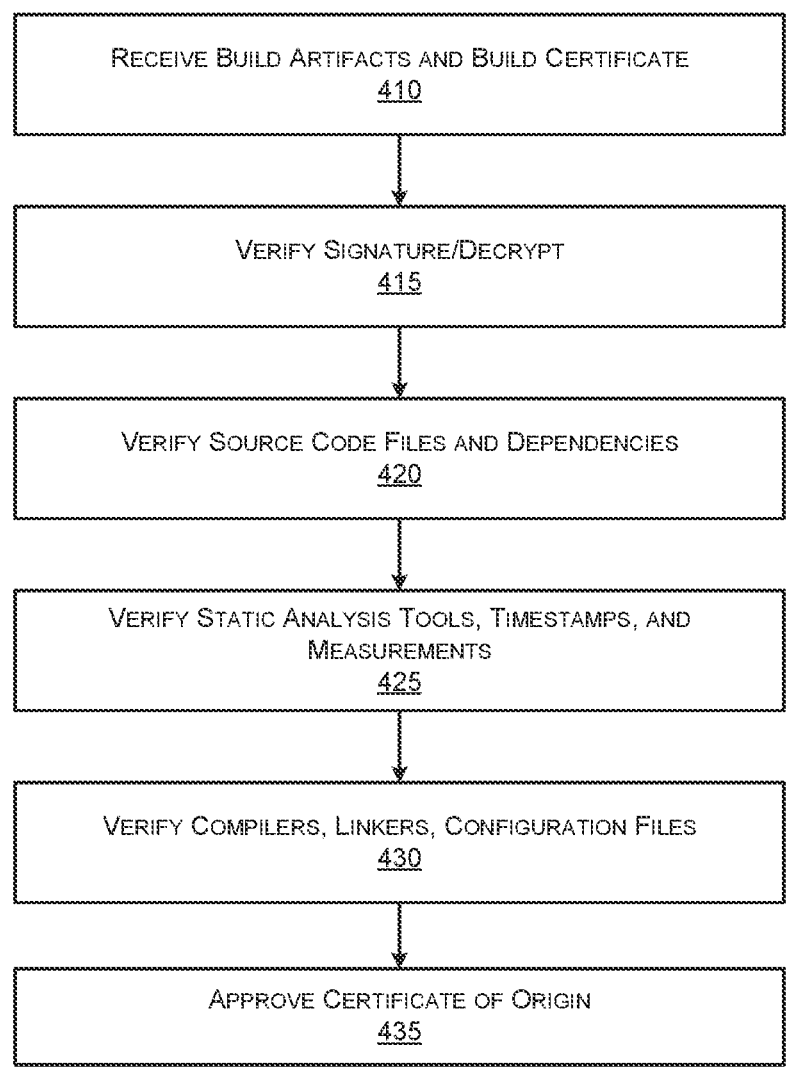
FIG. 4 is a simplified flow diagram of operations in a method to audit a software supply chain using a secure log generated in a trusted build environment according to an embodiment.

FIG. 4 is a simplified flow diagram of operations in a method 400 to audit a software supply chain using a secure log generated in a trusted build environment according to an embodiment. Referring to FIG. 4, at operation 410 an auditor 160 receives one or more build artifacts 112 and the associated build certificate(s) for the build artifact(s) 112. At operation 415 the auditor 160 verifies the signature applied to the build certificate(s) 154 by trusted build environment 100. At operation 420 the auditor 160 verifies the source code files and their dependencies provided as an input to the trusted build environment. At operation 425 the auditor 160 verifies the static analysis tools, timestamps, and measurements. At operation 430 the auditor verifies the compilers, linkers, and configuration files, and at operation 435 the auditor 160 approves the certificate of origin.

Figure 5:
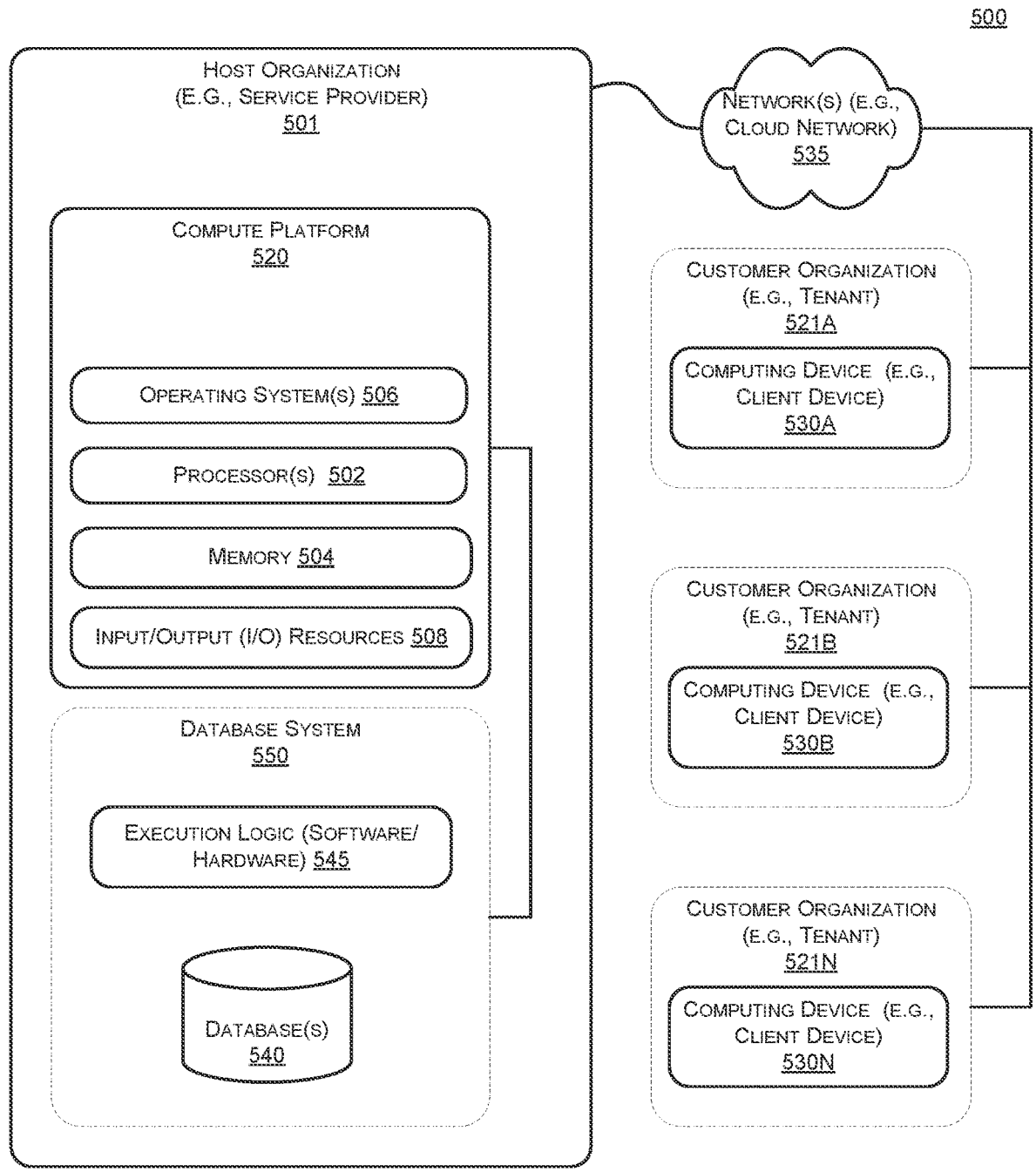
FIG. 5 is a simplified schematic diagram of a data processing environment in which techniques to protect a software supply chain using a secure log generated in a trusted build environment may be implemented, in accordance with an embodiment.

In some examples a build certificate 154 may be used by an execution environment to assess whether a given build artifact 112 can be executed in the execution environment. FIG. 5 is a simplified schematic diagram of an execution environment 500 in which techniques to protect a software supply chain using a secure log generated in a trusted build environment may be implemented, in accordance with an embodiment. Referring to FIG. 5, in one example an execution environment 500 may comprise a compute platform 520. In one embodiment, compute platform 520 includes one or more host computer servers for providing cloud computing services. Compute platform 520 may include (without limitation) server computers (e.g., cloud server computers, etc.), desktop computers, cluster-based computers, set-top boxes (e.g., Internet-based cable television set-top boxes, etc.), etc. Compute platform 520 includes an operating system ("OS") 506 serving as an interface between one or more hardware/physical resources of compute platform 520 and one or more client devices 530A-530N, etc. Compute platform 520 further includes processor(s) 502, memory 504, input/output ("I/O") sources 508, such as touchscreens, touch panels, touch pads, virtual or regular keyboards, virtual or regular mice, etc.

In one embodiment, host organization 501 may further employ a production environment that is communicably interfaced with client devices 530A-N through host organization 501. Client devices 530A-N may include (without limitation) customer organization-based server computers, desktop computers, laptop computers, mobile compute platforms, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database system 550 includes database(s) 540 to store (without limitation) information, relational tables, datasets, and underlying database records having tenant and user data therein on behalf of customer organizations 521A-N (e.g., tenants of database system 550 or their affiliated users). In alternative embodiments, a client-server computing architecture may be utilized in place of database system 550, or alternatively, a computing grid, or a pool of work servers, or some combination of hosted computing architectures may be utilized to carry out the computational workload and processing that is expected of host organization 501.

The illustrated database system 550 is shown to include one or more of underlying hardware, software, and logic elements 545 that implement, for example, database functionality and a code execution environment within host organization 501. In accordance with one embodiment, database system 550 further implements databases 540 to service database queries and other data interactions with the databases 540. In one embodiment, hardware, software, and logic elements 545 of database system 550 and its other elements, such as a distributed file store, a query interface, etc., may be separate and distinct from customer organizations (521A-521N) which utilize the services provided by host organization 101 by communicably interfacing with host organization 501 via network(s) 535 (e.g., cloud network, the Internet, etc.). In such a way, host organization 501 may implement on-demand services, on-demand database services, cloud computing services, etc., to subscribing customer organizations 521A-521N.

In some embodiments, host organization 501 receives input and other requests from a plurality of customer organizations 521A-N over one or more networks 535; for example, incoming search queries, database queries, application programming interface ("API") requests, interactions with displayed graphical user interfaces and displays at client devices 530A-N, or other inputs may be received from customer organizations 521A-N to be processed against database system 550 as queries via a query interface and stored at a distributed file store, pursuant to which results are then returned to an originator or requestor, such as a user of client devices 530A-N at any of customer organizations 521A-N.

As aforementioned, in one embodiment, each customer organization 521A-N may include an entity selected from a group consisting of a separate and distinct remote organization, an organizational group within host organization 501, a business partner of host organization 501, a customer organization 521A-N that subscribes to cloud computing services provided by host organization 501, etc.

In one embodiment, requests are received at, or submitted to, a server within host organization 501. Host organization 501 may receive a variety of requests for processing by host organization 501 and its database system 550. For example, incoming requests received at the server may specify which services from host organization 501 are to be provided, such as query requests, search request, status requests, database transactions, graphical user interface requests and interactions, processing requests to retrieve, update, or store data on behalf of one of customer organizations 521A-N, code execution requests, and so forth. Further, the server at host organization 501 may be responsible for receiving requests from various customer organizations 521A-N via network(s) 535 on behalf of the query interface and for providing a web-based interface or other graphical displays to one or more end-user client devices 530A-N or machines originating such data requests.

Further, host organization 501 may implement a request interface via the server or as a stand-alone interface to receive requests packets or other requests from the client devices 530A-N. The request interface may further support the return of response packets or other replies and responses in an outgoing direction from host organization 501 to one or more client devices 530A-N.

Figure 6:
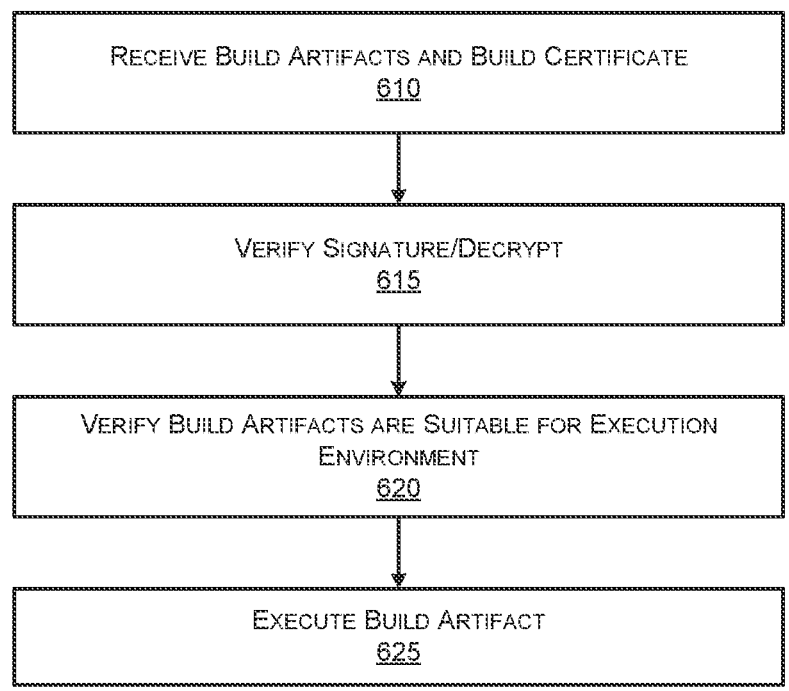
FIG. 6 is a simplified flow diagram of operations in a method to validate a software supply chain using a secure log generated in a trusted build environment according to an embodiment.

FIG. 6 is a simplified flow diagram of operations in a method 600 to validate a software supply chain using a secure log generated in a trusted build environment according to an embodiment. In some examples the operations depicted in FIG. 6 may be implemented by one or more computing devices in the execution environment 500. Referring to FIG. 6, at operation 610 the execution environment 500 receives one or more build artifact(s) 112 and the associated build certificate(s) 154. At operation 615 the execution environment 500 verifies the digital signature associated with the build certificate(s) 154. At operation 620 the execution environment verifies that the build artifact(s) 112 are suitable for execution in the execution environment 500. In some examples, the execution environment 500 may verify that the contents of the build certificate match policies defined by the owner/operator of the execution environment 500. For example, the policies may only allow executables built using specified versions of build tools, or may require that the artifact went through certain IP scanning, or that a given test suite was executed and passed (e.g., WHQL certification-like enforcement). At operation 625, the build artifact 112 is executed in the execution environment 500.

Exemplary Computing Architecture

FIG. 7 is a block diagram illustrating a computing architecture which may be adapted to implement a secure address translation service using a permission table (e.g., HPT 135 or HPT 260) and based on a context of a requesting device in accordance with some examples. The embodiments may include a computing architecture supporting one or more of (i) verification of access permissions for a translated request prior to allowing a memory operation to proceed; (ii) prefetching of page permission entries of an HPT responsive to a translation request; and (iii) facilitating dynamic building of the HPT page permissions by system software as described above.

In various embodiments, the computing architecture 700 may comprise or be implemented as part of an electronic device. In some embodiments, the computing architecture 700 may be representative, for example, of a computer system that implements one or more components of the operating environments described above. In some embodiments, computing architecture 700 may be representative of one or more portions or components in support of a secure address translation service that implements one or more techniques described herein.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 714. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Example 1 is method comprising generating, during a software build process conducted in a trusted build environment, a trusted log comprising a plurality of records of actions performed during the software build process and a plurality of identifiers of tools used to perform the actions; aggregating the plurality of records of actions and the plurality of identifiers into a build certificate file; generating a digital signature to be applied to the build certificate; and publishing the build certificate in association with one or more build artifacts generated by the software build process.

Example 2 includes the subject matter of Example 1, wherein the plurality of records of actions comprises at least one of one or more timestamps of an executed binary file; or one or more hashes of the executed binary file.

Example 3 includes the subject matter of Examples 1-2, wherein the plurality of records of actions comprises at least one of one or more identifiers of a scanner tool used in the build process; one or more identifiers of a version of a binary file scanned; or one or more hashes of the scanned binary file.

Example 4 includes the subject matter of Examples 1-3, wherein the plurality of records of actions comprises at least one of one or more build configurations; one or more identifiers of a compiler used to compile a build artifact; or one or more identifiers of a linker used to compile a build artifact.

Example 5 includes the subject matter of Examples 1-4, wherein the plurality of records of actions comprises at least one of one or more test suites; or one or more identifiers of a validation process used to validate a build artifact.

Example 6 includes the subject matter of Examples 1-5, further comprising verifying, during an audit process, the plurality of records of actions and the plurality of identifiers in the build certificate file.

Example 7 includes the subject matter of Examples 1-6 further comprising verifying, in an execution environment, that the plurality of records of actions and the plurality of identifiers match one or more policies of the execution environment.

Example 8 is an apparatus, comprising a processor and a computer readable memory comprising instructions which, when executed by the processor, cause the processor to generate, during a software build process conducted in a trusted build environment, a trusted log comprising a plurality of records of actions performed during the software build process and a plurality of identifiers of tools used to perform the actions; aggregate the plurality of records of actions and the plurality of identifiers into a build certificate file; generate a digital signature to be applied to the build certificate; and publish the build certificate in association with one or more build artifacts generated by the software build process.

Example 9 includes the subject matter of Example 8, wherein the plurality of records of actions comprises at least one of one or more timestamps of an executed binary file; or one or more hashes of the executed binary file.

Example 10 includes the subject matter of Examples 8-9, wherein the plurality of records of actions comprises at least one of one or more identifiers of a scanner tool used in the build process; one or more identifiers of a version of a binary file scanned; or one or more hashes of the scanned binary file.

Example 11 includes the subject matter of Examples 8-10, wherein the plurality of records of actions comprises at least one of one or more build configurations; one or more identifiers of a compiler used to compile a build artifact; or one or more identifiers of a linker used to compile a build artifact.

Example 12 includes the subject matter of Examples 8-11, wherein the plurality of records of actions comprises at least one of one or more test suites; or one or more identifiers of a validation process used to validate a build artifact.

Example 13 includes the subject matter of Examples 8-12, the computer readable memory comprising instructions which, when executed by the processor, cause the processor to verify, during an audit process, the plurality of records of actions and the plurality of identifiers in the build certificate file.

Example 14 includes the subject matter of Examples 8-13, wherein authentication procedure requires that at least a portion of the challenge-response pairs generated include a generated response that does not match an expected response.

Example 15 is one or more computer-readable storage media comprising instructions stored thereon that, in response to being executed, cause a computing device to generate, during a software build process conducted in a trusted build environment, a trusted log comprising a plurality of records of actions performed during the software build process and a plurality of identifiers of tools used to perform the actions; aggregate the plurality of records of actions and the plurality of identifiers into a build certificate file; generate a digital signature to be applied to the build certificate; and publish the build certificate in association with one or more build artifacts generated by the software build process.

Example 16 includes the subject matter of Examples 13-15, wherein the plurality of records of actions comprises at least one of one or more timestamps of an executed binary file; or one or more hashes of the executed binary file.

Example 17 includes the subject matter of Examples 15-16, wherein the plurality of records of actions comprises at least one of one or more identifiers of a scanner tool used in the build process; one or more identifiers of a version of a binary file scanned; or one or more hashes of the scanned binary file.

Example 18 includes the subject matter of Examples 15-17, wherein the plurality of records of actions comprises at least one of one or more build configurations; one or more identifiers of a compiler used to compile a build artifact; or one or more identifiers of a linker used to compile a build artifact.

Example 19 includes the subject matter of Examples 15-18, wherein the plurality of records of actions comprises at least one of one or more test suites; or one or more identifiers of a validation process used to validate a build artifact.

Example 20 includes the subject matter of Examples 15-19, further comprising instructions stored thereon that, in response to being executed, cause the computing device to verify, during an audit process, the plurality of records of actions and the plurality of identifiers in the build certificate file.

Example 21 includes the subject matter of Examples 15-20, further comprising instructions stored thereon that, in response to being executed, cause the computing device to verify, in an execution environment, that the plurality of records of actions and the plurality of identifiers match one or more policies of the execution environment.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A processor-implemented method comprising:
    generating a trusted log comprising a plurality of records of actions performed during a software build process;
    aggregating the plurality of records of actions into a build certificate file;
    applying a digital signature to the build certificate file; and
    publishing the build certificate file, wherein the digital signature is generated and associated with the built certificate file, wherein the built certificate file is published in association with one or more built artifacts generated based on the software-built process in a trusted built environment.

2. The method of claim 1, further comprising:
    generating a plurality of identifiers associated with tools used to perform the actions, wherein the plurality of records of actions and the identifiers are generated during the software-built process conducted in a trusted built environment,
    wherein the plurality of records of actions comprises at least one of:
        one or more timestamps of an executed binary file; or
        one or more hashes of the executed binary file.

3. The method of claim 1, wherein the plurality of records of actions comprises at least one of:
    one or more identifiers of a scanner tool used in the build process;
    one or more identifiers of a version of a binary file scanned; or
    one or more hashes of the scanned binary file.

4. The method of claim 1, wherein the plurality of records of actions comprises at least one of:
    one or more build configurations;
    one or more identifiers of a compiler used to compile a build artifact; or
    one or more identifiers of a linker used to compile a build artifact.

5. The method of claim 1, wherein the plurality of records of actions comprises at least one of:
    one or more test suites; or
    one or more identifiers of a validation process used to validate a build artifact.

6. The method of claim 1, further comprising:
    verifying, during an audit process, the plurality of records of actions and the plurality of identifiers in the build certificate file, and verifying, in an execution environment, that the plurality of records of actions and the plurality of identifiers match one or more policies of the execution environment.

7. An apparatus comprising:
processor circuitry coupled to a memory, the processor circuitry to:
generate a trusted log comprising a plurality of records of actions performed during a software build process;
aggregate the plurality of records of actions into a build certificate file;
apply a digital signature to the build certificate; and
publish the build certificate, wherein the digital signature is generated and associated with the built certificate file, wherein the built certificate file is published in association with one or more built artifacts generated based on the software-built process in a trusted built environment.

8. The apparatus of claim 7, wherein the processor circuitry is further to:
generate a plurality of identifiers associated with tools used to perform the actions, wherein the plurality of records of actions and the identifiers are generated during the software-built process conducted in a trusted built environment,
wherein the plurality of records of actions comprises at least one of:
one or more timestamps of an executed binary file; or
one or more hashes of the executed binary file.

9. The apparatus of claim 7, wherein the plurality of records of actions comprises at least one of:
one or more identifiers of a scanner tool used in the build process;
one or more identifiers of a version of a binary file scanned; or
one or more hashes of the scanned binary file.

10. The apparatus of claim 7, the computer readable memory comprising instructions which, when executed by the processor, cause the processor to:
wherein the plurality of records of actions comprises at least one of:
one or more build configurations;
one or more identifiers of a compiler used to compile a build artifact; or
one or more identifiers of a linker used to compile a build artifact.

11. The apparatus of claim 7, wherein the plurality of records of actions comprises at least one of:
one or more test suites; or
one or more identifiers of a validation process used to validate a build artifact.

12. The apparatus of claim 7, the processor circuitry is further to:
verify, during an audit process, the plurality of records of actions and the plurality of identifiers in the build certificate file; and
verifying, in an execution environment, that the plurality of records of actions and the plurality of identifiers match one or more policies of the execution environment.

13. At least one non-transitory computer-readable medium having stored thereon instructions which, when executed, cause a computing device to perform operations comprising:
generate a plurality of records of actions performed during a software build process;
aggregate the plurality of records of actions into a build certificate file;
apply a digital signature to the build certificate; and
publish the build certificate, wherein the digital signature is generated and associated with the built certificate file, wherein the built certificate file is published in association with one or more built artifacts generated based on the software-built process in a trusted built environment.

14. The non-transitory computer-readable medium of claim 13, wherein the plurality of records of actions comprises at least one of:
one or more timestamps of an executed binary file; or
one or more hashes of the executed binary file.

15. The non-transitory computer-readable medium of claim 14, wherein the plurality of records of actions comprises at least one of:
one or more identifiers of a scanner tool used in the build process;
one or more identifiers of a version of a binary file scanned; or
one or more hashes of the scanned binary file.

16. The non-transitory computer-readable medium of claim 15, wherein the plurality of records of actions comprises at least one of:
one or more build configurations;
one or more identifiers of a compiler used to compile a build artifact; or
one or more identifiers of a linker used to compile a build artifact.

17. The non-transitory computer-readable medium of claim 15, wherein the plurality of records of actions comprises at least one of:
one or more test suites; or
one or more identifiers of a validation process used to validate a build artifact.

18. The non-transitory computer-readable medium of claim 13, wherein the operations further comprise:
verify, during an audit process, the plurality of records of actions and the plurality of identifiers in the build certificate file; and
verify, in an execution environment, that the plurality of records of actions and the plurality of identifiers match one or more policies of the execution environment.

\* \* \* \* \*